United States Patent
Dillon

(10) Patent No.: US 12,278,808 B2
(45) Date of Patent: Apr. 15, 2025

(54) SECURING GROUP UPDATES OVER HYPERTEXT TRANSFER PROTOCOL

(71) Applicant: SENTRIQS, INC., Reno, NV (US)

(72) Inventor: Paul Dillon, Erie, PA (US)

(73) Assignee: SENTRIQS, INC., Reno, NV (US)

( * ) Notice: Subject to any disclaimer, the term of this patent is extended or adjusted under 35 U.S.C. 154(b) by 129 days.

(21) Appl. No.: 18/189,525

(22) Filed: Mar. 24, 2023

(65) Prior Publication Data

US 2024/0323013 A1    Sep. 26, 2024

(51) Int. Cl.
| H04L 29/06 | (2006.01) |
| H04L 9/08 | (2006.01) |
| H04L 9/30 | (2006.01) |
| H04L 9/40 | (2022.01) |

(52) U.S. Cl.
CPC .......... *H04L 63/065* (2013.01); *H04L 9/0836* (2013.01); *H04L 9/0891* (2013.01); *H04L 9/3073* (2013.01)

(58) Field of Classification Search
None
See application file for complete search history.

(56) References Cited

U.S. PATENT DOCUMENTS

| 6,684,331 | B1* | 1/2004 | Srivastava | H04L 12/185 713/168 |
| 7,096,356 | B1* | 8/2006 | Chen | H04L 9/0841 713/163 |
| 7,434,046 | B1* | 10/2008 | Srivastava | H04L 9/0891 713/168 |
| 8,560,843 | B1 | 10/2013 | Moscaritolo et al. | |
| 11,050,723 | B1 | 6/2021 | Mahdavi et al. | |
| 2014/0281542 | A1 | 9/2014 | Bono et al. | |
| 2016/0365982 | A1 | 12/2016 | Tutt et al. | |
| 2018/0270053 | A1* | 9/2018 | Hanatani | H04L 9/0836 |

OTHER PUBLICATIONS

International Search Report and Written Opinion issued in corresponding International Application No. PCT/US2024/019933 on Jun. 17, 2024 (11 pages).
International Search Report and Written Opinion issued in corresponding International Application No. PCT/US2022/078528 on Jan. 25, 2023 (15 pages).

(Continued)

*Primary Examiner* — Bradley W Holder
(74) *Attorney, Agent, or Firm* — Perkins Coie LLP

(57) ABSTRACT

Systems and methods are disclosed herein for managing group membership. To remove a user from a group, a group management system ensures that the device associated with the user is no longer able to decrypt messages that are sent by other devices in the group, in spite of having a copy of the binary tree associated with the group. Accordingly, the group management system may update private and public keys that the device may access while ensuring that other devices get the updated private and public keys. The group management system may manipulate the binary tree to move the root node and the sibling node of the node associated with the user being removed such that the update to the binary tree ensures the remaining group members are able to properly participate in future group update operation for which the binary tree may be necessary.

20 Claims, 9 Drawing Sheets

(56) References Cited

OTHER PUBLICATIONS

Beurdouche et al., "The Messaging Layer Security (MLS) Architecture," The Wayback Machine, Network Working Group, Internet-Draft: draft-ietf-mls-architecture-latest, published on Jun. 23, 2021, https://messaginglayersecurity.rocks/mls-architecture/draft-ietf-mls-architecture.html (31 pages).

* cited by examiner

600

620

SECURING GROUP UPDATES OVER HYPERTEXT TRANSFER PROTOCOL

BACKGROUND

Many messaging applications exist that enable users to communicate via the Internet. Those messaging applications include an ability to communicate with a single person and with a group of people. Because of communication security concerns, various messaging applications employ various encryption technologies to enable secure communications both for usage for person-to-person communications and person-to-group communications. Some applications use Message Layer Security (MLS) encryption to perform encryption on person-to-group communications. MLS enables encryption of person-to-group communications such that each message is independently encrypted. Thus, if one message is compromised other messages within the conversation will not be compromised. This unique feature creates some difficulties in group management (e.g., when adding and removing users from a group). In particular, group management may be challenging in situations where each message from each group member is encrypted with a different key derived on the fly such that all group members are able to securely read the message. In order to achieve this, each member may possess the information needed to derive these keys, and, when a user is removed from a group, it may be challenging to update the group membership in such a way that the removed user no longer possesses this information and is unable to access messages from other group members by continuing to derive keys based on it.

SUMMARY

To address these and other issues an end-to-end mechanism is disclosed herein for securely updating group membership. In particular, the disclosed mechanism enables adding and removing users from a group. Thus, a group management system may be used to perform the operations disclosed here. The group management system may receive a request to remove a user from a group. In some embodiments, to remove a user from a group, the group management system ensures that the device associated with the user is no longer able to decrypt messages that are sent by other devices in the group, despite having a copy of the private information associated with the group. Accordingly, the group management system may update this information, choosing or deriving new secret keys and private/public key pairs as needed, for every remaining device such that the old private information associated with the group, to which the removed device has access, is rendered worthless. Where this private information may be organized in a binary tree (e.g., as specified for a Message Layer Security (MLS) protocol, the group management system may manipulate the binary tree of each remaining member to move four nodes—the node being removed, the root node, the sibling node of the node being removed, and the right-most leaf node—such that the update to the binary tree excludes the node being removed and updates the tree's information such that all remaining devices may properly participate in the MLS protocol.

In some embodiments, the group management system may associate each group with a binary tree, and the binary tree may include a plurality of leaf nodes with each leaf node of the plurality of leaf nodes representing a corresponding user or device within the group. A public/private key pair may be associated with all nodes in the binary tree, but the private key may only be known to some users or devices, i.e., each copy of the binary tree possessed by a given user or device may contain the private keys for a different set of nodes in the tree. At a minimum, a device's copy of the binary tree may include the private keys for the leaf node associated with itself, the parent of this leaf node, and each subsequent parent node up to the root node of the tree. Also, the group management system may temporarily or permanently associate other secret keys with each node of the binary tree for the purposes of performing group management operations (e.g., adding and removing nodes).

In some embodiments, the group management system may receive a request to remove a user or device from a group. For example, an administrator may send a request to the group management system to remove a particular user from the group. The user may be associated with a particular device that is hosting the binary tree for the user.

The group management system may locate, within the binary tree, (1) a root node, (2) a leaving leaf node associated with the user being removed from the group, (3) a sibling leaf node corresponding to a node that shares a parent node with the leaving leaf node, (4) a right-most leaf node, and (5) the immediate parent node of the right-most leaf node. Those nodes will be used by the group management system during the user removal operation. The root node may refer to a node within the binary tree that has no parent nodes.

The group management system may copy sibling node parameters of the sibling leaf node into a temporary storage, and root node parameters from the root node into the sibling leaf node. The group management system may perform this operation to save the data of the sibling leaf node because the sibling leaf node is overwritten with the data from the root node. In some embodiments, the sibling node parameters may include any identifiers, a private key, and a public key associated with the sibling leaf node and the root node parameters may include a private key and a public key associated with the root node.

In some embodiments, copying may instead take the form of rearranging pointer memory addresses within the binary tree structure such that, for example, any addresses formerly referring to the sibling node are updated to refer to the former root node and any addresses formerly linking from the former root to its former children are removed or updated to refer to nothing or, for example, an address referencing the parent of the sibling leaf node may be updated to reference nothing and an address referencing the parent of the former root node is updated to reference the former parent of the sibling leaf node. Thus, the group management system may update a first set of pointers associated with the sibling leaf node to assign the sibling leaf node to a temporary storage, and a second set of pointers associated with the root node to assign the root node to a position of the sibling leaf node within the binary tree.

The group management system may compute an update path from the leaving leaf node to the root node. The update path may include a plurality of nodes connecting the leaving leaf node to the root node. For example, the group management system may determine that there are three nodes between the leaving leaf node and the root node. Those may include the immediate parent of the leaving leaf node, its parent, etc., all the way up to the root node. The disclosure also uses the term "update path" to refer to the result of the computation and processing performed for each node along this path and gathered into a set of intermediate results that may be safely communicated to other devices of a group, which each then use as the starting point for updating its copy of the binary tree so as to arrive at the same end result as the original device.

The group management system may then update a plurality of node parameters for each node along the update path between the leaving leaf node and the root node. For example, the group management system, on a single device, may erase the public and private keys for each node along the path and derive new public and private keys using a particular algorithm. The group management system may then communicate this derivation, in whole or in part, to the other devices in the group, so that those keys may then be derived by those devices that are updating their respective binary trees for the group.

The group management system may replace the root node parameters within the sibling leaf node with the sibling node parameters from the temporary storage. For example, the group management system may replace corresponding private and public keys associated with the sibling leaf node. When the replacement is completed, the group management system may interchange leaving leaf node parameters within the leaving leaf node with right-most node parameters from a right-most leaf node. The interchange operation will move the leaving leaf node into the right-most position in the binary tree so that the leaving node may be removed without affecting other nodes within the binary tree. In some embodiments, instead of replacing node parameters, the group management system may replace the root node with the sibling leaf node. The replacement operation may include updating the first set of pointers associated with the sibling leaf node and the second set of pointers associated with the root node.

The group management system may then remove the right-most leaf node and its immediate parent node from the binary tree. In some cases, the sibling of the right-most leaf node, which may be losing its parent in this removal, replaces its former parent, ascending one level in the binary tree. In other cases, this sibling happens to become the new root node of the tree. In some embodiments, the group management system may remove the right-most leaf node along with its immediate parent node from the binary tree, such that the removal operation may perform pointer manipulation within the binary tree.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
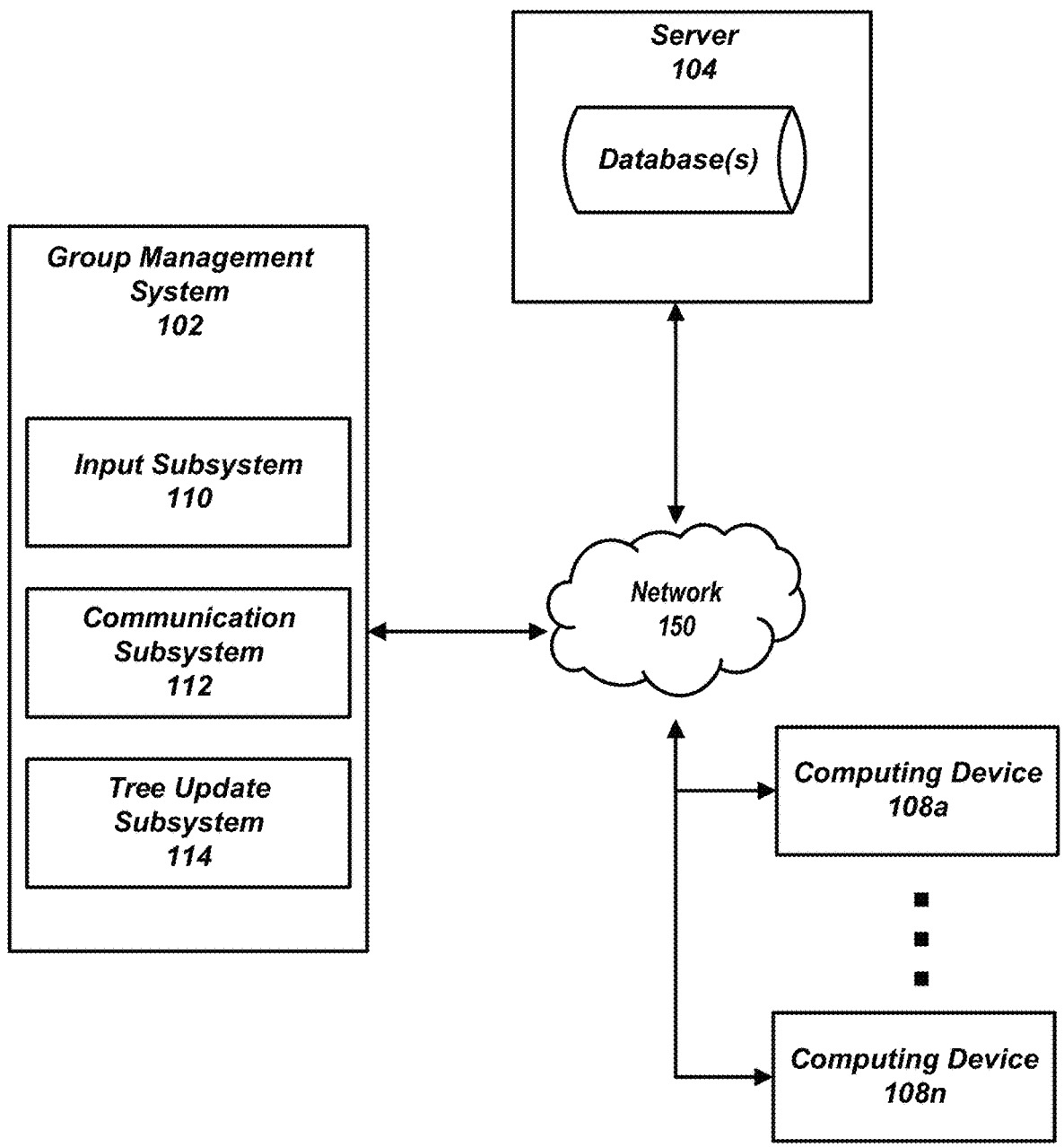
FIG. 1 illustrates an example computing environment for managing group membership, in accordance with some embodiments of this disclosure.

FIG. 1 shows an example system 100 for performing group management operations. System 100 includes group management system 102, server 104, and computing devices 108a-108n. Group management system 102 may execute instructions for performing group management operations. Group management system 102 may include software, hardware or a combination of the two. For example, group management system 102 may be a physical computing device or a virtual computing device that is running on a physical computing device. Group management system 102 may be hosted on a personal computer, a smart phone, a laptop computing device, an electronic tablet, or another suitable computing device. In some embodiments, group management system 102 may be hosted on a cloud computing device and may be accessed by a thin client. Some components of group management system 102 may be hosted on a server device (e.g., server 104). Group management system 102 may include input subsystem 110, communication subsystem 112, and tree update subsystem 114. Group management system 102 may include other components (e.g., as described in FIG. 4).

Input subsystem 110 may include software components, hardware components, or a combination of both. For example, input subsystem 110 may include one or more input devices (e.g., a keyboard, mouse, microphone, etc.) coupled with software to drive those devices. Communication subsystem 112 may include software components, hardware components, or a combination of both. For example, communication subsystem 112 may include a network card (e.g., a wireless network card and/or a wired network card) that is coupled with software to drive the card. Tree update subsystem 114 may include software components, hardware components, or a combination of both. For example, tree update subsystem 114 may include software components that access data in memory and/or storage, and may use one or more processors to perform its operations.

Server 104 may host server components associated with group management system 102 as well as other server components. In some embodiments server 104 may host server-side components for multiple applications while those applications may have a client-side component that is executed on a client device (e.g., group management system 102 and or computing devices 108a-108n). Server 104 may include software, hardware, or a combination of the two. For example, server 104 may be a physical server, or a virtual server that is running on a physical computer system. Network 150 may be a local area network, a wide area network (e.g., the Internet), or a combination of the two. Computing devices 108a-108n may include components similar to components of group management system 102.

The operations described below may use the following concepts related to encryption of group messages. In an established group, each group member may maintain (e.g., within a web browser or another type of storage) cryptographic information needed to (1) encrypt its own messages and (2) decrypt the messages received from other group members. The encryption mechanism may employ a traditional symmetric key encryption algorithm, which may require the sender and receiver(s) to have access to a common, single shared key that may be an input to the encryption and decryption processes. Several mechanisms may be used to safely and securely distribute to all group members the data for establishing the set of shared keys that may be employed when invoking the symmetric key encryption.

The first mechanism may involve a concept referred to as a "ratchet". As referred to herein, the term ratchet refers to a mechanism that takes one secret (e.g., a key generation secret) as input and deterministically produces two outputs: (1) a secret to be used with the symmetric key encryption algorithm (e.g., an encryption/decryption key) and (2) a secret intended to be cycled back as the next input to the ratchet mechanism (the new key generation secret). In some embodiments, a ratchet may only produce one output secret, and that secret may serve as both the encryption secret and the new key generation secret. With this mechanism, a sender and each recipient may exchange an initial shared secret to be used as the first input to their respective copies of a ratchet and then each independently produce the same sequence of shared secrets where the sender may utilize one output from the ratchet to produce an encrypted message and the recipient may utilize that output to decrypt the message before they both discard the secret and move on to the next secret in the sequence.

Each group member may maintain a set of ratchets, assigning one to each group member such that the assigned ratchet may be utilized when the corresponding group member sends a message. In this way, the system may ensure that each member receives the initial shared secret for each of the ratchets in the group.

To that end, the second mechanism may employ a binary tree structure that allows for the efficient computation of these initial secrets. In some embodiments, within the binary tree structure, the ratchets may be arranged for the group members as leaves of the tree. Then, starting with an initial, single input secret (e.g., key generation secret) assigned to the root of the tree, the group management system may deterministically derive secrets to assign to each of the root's children in a fashion similar to the derivation made by a ratchet. This process may then be repeated with the children of the root's children down the tree until a unique secret (e.g., key generation secret) is assigned to each of the leaves of the tree. Each unique secret may then serve as the initial input to the ratchet corresponding to the group member at that position in the binary tree. Thus, a single initial secret, the root secret, may be used to derive the set of secrets that initialize the ratchets within the binary tree.

Furthermore, the group management system distributes secret information to all group members that allows the group members to derive the root secret without disclosing secret information to any unintended third party, which is achieved utilizing a key exchange or key encapsulation mechanism, but one where the public/private key pair(s) used to secure the secret information is not chosen randomly. Instead, the key pair(s) may also be deterministically derived from other secrets.

To select this information and perform this distribution, a third mechanism may again employ the same binary tree to compute (1) secrets used to derive the root secret and (2) a set of public/private key pairs that are assigned to the interior nodes of the tree and used to encapsulate these secrets for distribution to other group members. The mechanism may require the binary tree to be unbalanced and left-filled, such that all nodes other than the root have a sibling. With an existing group, a computing device of each group member (e.g., computing devices 108a-108n) may store the position of its own leaf node in the binary tree and may be in possession of the private keys assigned to the parent of that leaf node and each subsequent parent up to the root node. In addition, each computing device may store its own public/private key pair, assigned to its own leaf node, which may formally identify the member to the group. Each computing device may also be in possession of the public keys assigned to all the nodes in the binary tree.

When one group member initiates an action for which the ratchets may be (re)initialized, the mechanism may utilize a path in the binary tree from the leaf corresponding to this acting group member up to the root, i.e., the update path. The parent of the leaf in this path, as well as each parent up to the root, may have one inactive child, the child that is not a member of this path. The public key for this inactive child may be used with the key encapsulation algorithm to generate a new secret (e.g., key generation secret) to assign to the parent, or a new secret (e.g., new key generation secret) may randomly be chosen and encrypted with the public key. The group management system may add the encrypted secret to a message to be distributed to the other group members. The secret may also be used to derive a new public/private key pair to assign to the parent. The secret may also be used as the input to derive an output secret that is assigned to the parent of the parent. The message processing system may repeat the process for each parent in the path using the previous step's output secret to derive the new key pair and next output secret. The final output secret may then be defined as the root secret described above. The result of this mechanism is (1) a message containing a list of novel secrets, each encrypted with a different public key, and (2) a new set of key pairs for the nodes of the tree along this path.

When the group management system receives the message, another group member may be assured that at least one private key positioned along its path from leaf to root corresponds to one of the public keys used to encrypt the secrets in the message. The message processing system may use this private key to decrypt the corresponding secret, thereby allowing the member to complete the operation, repeatedly deriving secrets and key pairs for nodes in a local copy of the binary tree up to the root. The message processing system may ultimately arrive at the original root secret derived by the sender.

Although sending and receiving messages is the object of any messaging system, group management is also an important function of any such system. In some embodiments, a group may be defined as a set of devices participating in an exchange of cryptographically secure messages. Each has a copy of the group state, which may be a binary tree.

The binary tree may contain one less than twice as many nodes as group members. For example, for n members there may be 2n–1 nodes. These nodes may be arranged into a complete left-balanced binary tree, where each member of the group may be represented by a leaf of the tree. In some embodiments, each node of the tree may be assigned a number, its index, starting from zero and starting from the left such that the leaves may be assigned even integers and the interior nodes may be assigned the odd integers.

Several parameters/properties may be associated with each node of the tree. In particular, a public/private key pair may be stored within a particular node. The keys may be used to asymmetrically encrypt and decrypt secret information shared amongst group members. Leaf nodes may additionally store (1) identifiers for their associated users and devices and (2) the secret key(s) that drive the ratchet mechanisms used when encrypting and decrypting group message payloads.

Figure 2:
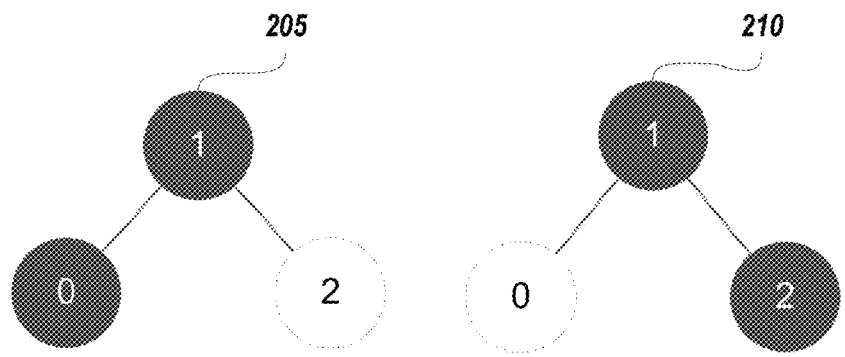
FIG. 2 illustrates binary tree structures, in accordance with some embodiments of this disclosure.
Figure 2:
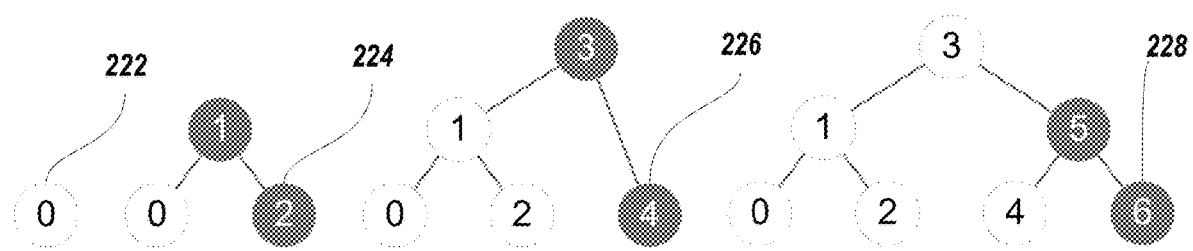

In some embodiments, not every node stores the private key associated with the node. The private key for each leaf node should be known only to the device associated with that node and may consequently be stored on that leaf node for only that device's copy of the binary tree. Other private keys may be stored with multiple group members. In some embodiments, the invariant that may be maintained is that each member must possess the private key assigned to each node along the path from its corresponding leaf node to the root node. For example, in group 200 of FIG. 2 with only two members, each member may have a copy of the binary tree. Furthermore, in the left member's copy 205, nodes zero and one may store the appropriate private keys where node two only possesses the associated public key. Similarly, the right member's copy 210 may possess private keys for nodes one and two but not node zero. As discussed below, other values may be temporarily associated with nodes in the tree in service of performing various group operations that ultimately derive new values for these more permanent node values.

Group Creation and New Members

The process for creating a new group may be similar to that for adding new members to an existing group. The process for both may proceeds in three phases: (1) build or augment the binary tree to add leaves representing each of the (new) members, (2) perform a binary tree update to compute new keys for the group, and (3) distribute the changes to the group and welcome new members to the group.

In some embodiments, the binary tree starts with a single leaf node that represents the only group member. Nodes for subsequent members may then be added to the right side of the tree with an accompanying parent node such that the additions maintain the left-balanced and complete properties of the tree. In some instances, the added parent node becomes the new root of the tree. In other instances, both nodes are added to the right subtree of the root node. Group 220 of FIG. 2 starts out with a single member 222 and illustrates the addition of a second member 224, a third member 226, and fourth member 228. Furthermore, group 220 illustrates a binary tree that adds interior nodes as necessary with some interior nodes becoming the root node at various stages.

The newly added parent nodes may be initially empty, containing no encryption keys. The newly added leaf nodes contain only a public key previously published by each corresponding member. Thus, after adding several new members, the tree may contain a majority of empty nodes.

Node Removal and Binary Tree Update

In some embodiments, a member of a group may be removed from the group, but the member's corresponding leaf node is not removed from the binary tree. Instead, that leaf node corresponding to the member being removed and every node from that leaf node to the root of the tree may be replaced by empty nodes (e.g., the public/private keys and other information may be removed from those nodes). This process removes from the binary tree most of the cryptographic information to which the leaving member had access. Thus, this process may prevent any subsequent updates from encrypting secrets that the leaving node could then access. With potentially empty leaf nodes in the tree, any subsequent additions to the group may require that the system search for an existing empty leaf node before appending new nodes to the right side of the binary tree. When nodes are added to the binary tree an update may be performed on the binary tree.

An update to the binary tree may be performed as part of many group operations (e.g., group creation, member addition operations mentioned above, and member removal operations). Each operation may be performed by one of the group members, referred to here as the initiator or actor. And an update is the process by which new cryptographic information is produced for the group and packaged for distribution to other group members. As part of the update, an update path may be computed on a particular portion of the binary tree. The update path may then be distributed with other details of the operation to the other members of the group, that then may use the update path as the starting point for deriving new cryptographic information for their copy of the binary tree.

The initiator or the actor stores the index of its own corresponding leaf node. After mutating the binary tree (e.g., by adding or removing nodes in a manner that maintains its complete, left-balanced properties), the initiator may start from the initiator's own leaf node and may identify its parent and subsequent parents, ultimately identifying the root node of the binary tree. Along the way, the initiator derives private and public keys to assign to each node. For example, a new public/private key pair for each node may be assigned together with an output key to be assigned to the node's parent. The sequence of output keys (or a derivation of them) produced as the initiator walks up the binary tree may be individually encrypted and appended to a list, which composes an update path that may be distributed to other existing members of the group. Thus, those members may decrypt and subsequently derive the same keys for their copy of the binary tree as they perform a similar operation to walk up the binary tree.

To encrypt a given secret key at some node, the initiator may employ the public key from the node's other child node that is not part of the update path as this public key does not change during the update. In some instances, this child node may not yet have a public key associated with it. As a result, the initiator may descend further into this subtree, in both the left and right directions, and produce multiple encrypted copies of the secret, one for the first public key encountered along each path. In some instances, this causes the initiator to encrypt the secret separately and, in the worst case, once for every other member of the group.

Figure 3:
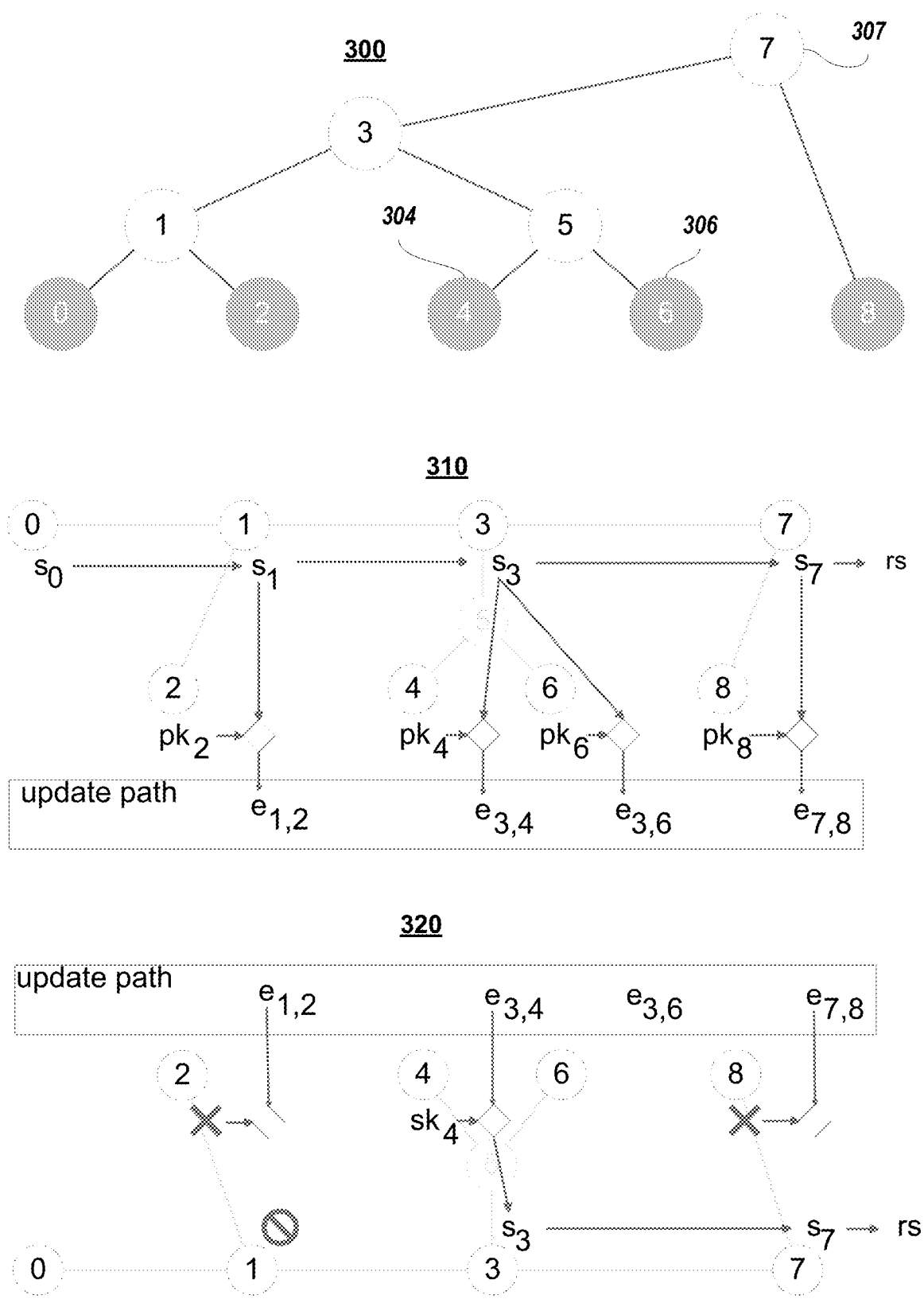
FIG. 3 illustrates computation of update paths, in accordance with some embodiments.

As an example, diagram 300 of FIG. 3 illustrates the five-member group where node seven (node 307) is the root of the tree and the member associated with node zero is performing an update. Node four corresponding to label 304 is illustrated as a node being removed from the binary tree. Node four may be referred to as a leaving leaf node. Node six corresponding to label 306 may be referred to as a sibling leaf node. Here, the device in question walks the update path, 0→1→3→7, as illustrated in diagram 310. An initial secret, s0, may be randomly chosen for node zero. This key may derive the secret key, s1, for node one, which in turn may derive the secret key, s3, for node three; s3 may derive the secret, s7, for node seven; and s7 may derive the root secret needed to ultimately initialize the ratchets for the group. Additionally, each of these secret keys may also derive a new public/private key pair to be assigned to and stored with nodes zero, one, three, and seven, respectively (not depicted). Finally, the algorithm may encrypt the secret keys, package them in a list, and include them in a message to transmit to other group members. While new public keys may be derived for nodes zero, one, three, and seven, the public keys for nodes two, four, six, and eight may remain unchanged, so that these may be used to encrypt the secrets. Each node for which a secret key was derived may have a child node that is not a member of the update path whose public key may be used to encrypt the secret. Thus, the public key at node two, pk2, may encrypt the secret, s1, to produce the encrypted data, e1,2. Similarly, the public key at node eight, pk8, may encrypt the secret, s7, to produce, e7,8. If node five is currently missing a public/private key pair, the algorithm may descend to the child of node five and may encrypt the secret, s3, twice: once using the public key at node four, pk4, and once using the public key at node six, pk6, producing e3,4 and e3,6, respectively. The encrypted outputs, c1,2, c3,4, c3,6, e7,8, may form a list that becomes part of an update message transmitted to other members of the group.

When received, other members are guaranteed to possess at least one of the private keys capable of successfully decrypting the corresponding secret in the update path message. With this key, the receiving member may derive the new public/private keys for the corresponding node and the remaining nodes up to the root, thereby maintaining the invariant of possessing the private keys along its own update path.

Diagram 320 of FIG. 3 depicts the decryption and processing done by node four when it receives the update path from node zero. Node four may not possess the private keys for any of nodes two, six, or eight. But, with its own private key, sk4, node four may decrypt the encrypted secret, e3,4, to obtain the secret, s3, which can then be used in turn to derive the secret, s7. With these two secrets, node four may derive the new public/private key pairs for nodes three and seven. Node four may not be able to derive the keys for node one, but, because node one does not lie on node four's path to the root node, this is expected and allowed. For both the initiator and any receiving member, a final output key, labeled as secret, rs, in diagram 320 of FIG. 3 may be derived at the root node of the binary tree that is used to derive additional keys, some of which may ultimately re-initialize the ratchet mechanisms used when encrypting content.

In some embodiments, as stated above, node removal involves each member of the group clearing public and private keys from the leaf node corresponding to the leaving member and also clearing public and private keys from nodes along the path from that leaf to the root node, leaving the leaf node intact, in position, but unused. In some embodiments, an alternative algorithm is disclosed for removing nodes from the binary tree that properly prunes the binary tree when a user leaves the group. Thus, using this algorithm each remaining group member is enabled to arrive at a binary tree containing one fewer leaf nodes while maintaining the invariant properties of the binary tree.

Figure 4:
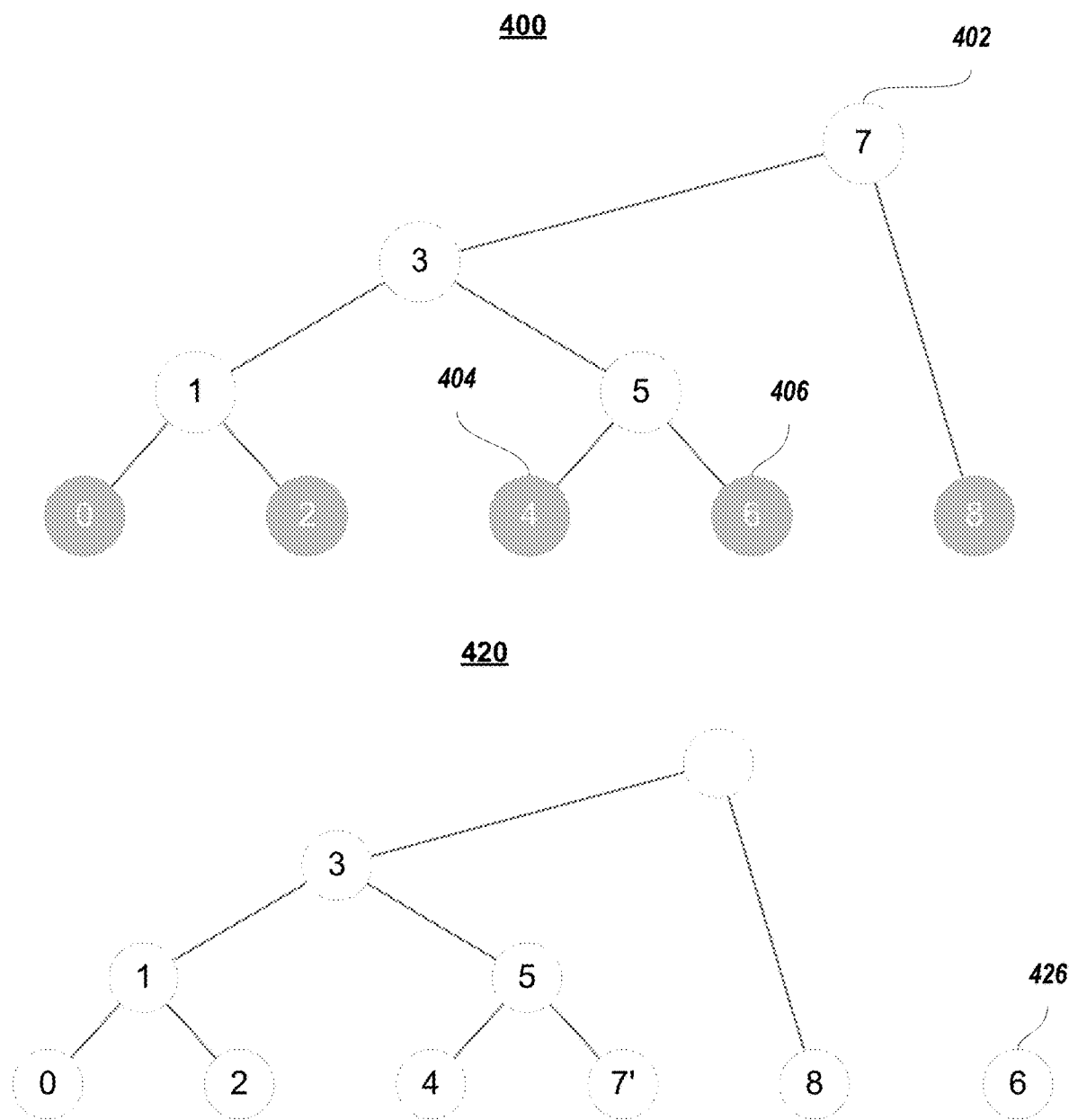
FIG. 4 illustrates rearranging nodes within the binary tree by either copying node parameters or manipulating pointers, in accordance with some embodiments of this disclosure.

In some embodiments, group management system 102 may receive (e.g., via input subsystem 110 or communication subsystem 112) a request to remove a user from a group. The group may be associated with a binary tree, and the binary tree may include a plurality of leaf nodes with each leaf node of the plurality of leaf nodes representing a corresponding user within the group. For example, binary tree 400 of FIG. 4 illustrates a five-member group with a root node 402 at position seven. Node four corresponding to label 404 is illustrated as a node being removed from the binary tree. Node four may be referred to as a leaving leaf node. Node six corresponding to label 406 may be referred to as a sibling leaf node. For example, group management system 102 may reside on a client device. Thus, input subsystem 110 may receive an input from a user to remove a member of the group. In some embodiments, group management system 102 may reside on a server device. Thus, communication subsystem 112 may receive the request to remove a member from the group.

Group management system 102 may (e.g., via tree update subsystem 114) locate, within the binary tree, (1) a root node, (2) a leaving leaf node associated with the user being removed from the group and (3) a sibling leaf node corresponding to a node that shares a parent node with the leaving leaf node. As shown in FIG. 4 by binary tree 400, group management system 102 may start at node (label 404), identify a parent of node four (node five) and then identify any other children of the parent node which would be node six. Accordingly, group management system 102 may identify the sibling leaf node. To identify the root node, group management system 102 may traverse the binary tree such that parents of each node up the binary tree are identified until a node does not have any parent. That node may be referred to as the root node (node seven in binary tree 400). Some embodiments may alternatively store the indices associated with each node in the binary tree and compute the index of the root node as a function of the total number of nodes in the tree.

Group management system 102 may (e.g., via tree update subsystem 114) copy sibling node parameters of the sibling leaf node into a temporary storage and also copy root node parameters from the root node into the sibling leaf node. For example, group management system 102 may copy public keys and private keys of the corresponding nodes when performing these operations. That is the sibling node parameters may include a sibling node private key and a sibling node public key, and the root node parameters may include a root private key and a root public key. Those private and public keys may be unique to each node. In some embodiments, the root node parameters may overwrite the parameters within the sibling leaf node. For example, the private and public keys within the sibling leaf node may be overwritten with public and private keys of the root node. This operation may be performed by erasing the sibling node parameters from the sibling leaf node and erasing the root node parameters from the root node. In some embodiments, instead of copying sibling node parameters into a temporary storage, group management system 102 may change a pointer of the sibling node that moves the sibling node outside of the binary tree and thus creates a temporary leaf node. In addition, group management system 102 may change the pointer of the root node so that the root node becomes the sibling leaf node within the binary tree. Thus, group management system 102 may update a first set of pointers associated with the sibling leaf node to assign the sibling leaf node to a temporary storage, and a second set of pointers associated with the root node to assign the root node to a position of the sibling leaf node within the binary tree.

Binary tree 420 of FIG. 4 illustrates the state of the binary tree after these particular operations have been completed. That is, node six corresponding to label 426, which is the sibling of node four (the leaving leaf node), has been temporarily moved out of the tree, and the former root node (node seven) has moved to the former position of node six, bringing its public/private key pair with it.

Group management system 102 (e.g., via tree update subsystem 114) may compute an update path from the leaving leaf node to the root node (e.g., the empty node at position seven). The update path may include a plurality of nodes connecting the leaving leaf node to the root node. For example, group management system 102 may traverse the updated binary tree from the leaving node to the root node and store indicators of nodes that it traverses. That is, group management system 102 may identify parent nodes starting from the leaving leaf node all the way up to the root node. The root node may not store any private or public keys at this time.

In some embodiments, group management system 102 (e.g., via tree update subsystem 114) may determine a plurality of parent nodes for the leaving leaf node. For example, group management system 102 may access the leaving leaf node and extract an identifier of the parent node from the leaving leaf node (e.g., identifier of node five). Group management system 102 may store the node identifier of the parent node. Group management system 102 may then identify the parent node of the parent node (e.g., the parent node of node five) by extracting that information from a data structure associated with the parent node (e.g., node five). Group management system 102 may traverse the tree in this way until group management system 102 discovers a node that has no parent (e.g., node seven). Thus, group management system 102 may identify the root node based on the root node not identifying (e.g., storing any information for) any parent nodes. Group management system 102 may then use the root private key and the root public key stored within the sibling leaf node to perform operations related to the root node.

Figure 5:
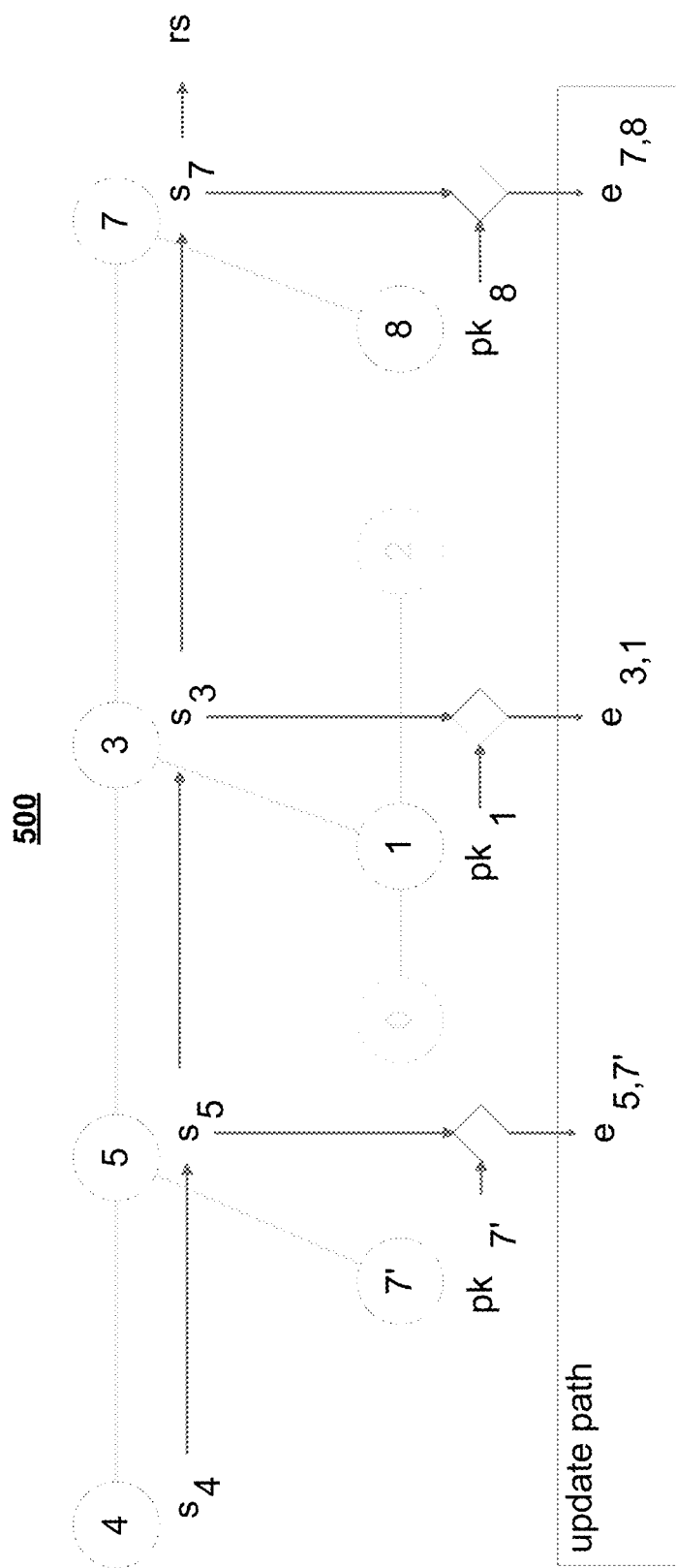
FIG. 5 illustrates an update path computation after node parameters have been copied, in accordance with some embodiments.

Group management system 102 (e.g., via tree update subsystem 114) may update a plurality of node parameters for each node along the update path between the leaving leaf node and the root node. In some embodiments, group management system 102 may update the plurality of node parameters for each node along the update path by iterating through each node within the update path to derive a corresponding node private key and a corresponding node public key. For example, if group management system 102 stores node identifiers of the update path, group management system 102 may take each node in turn (e.g., based on node identifiers) to perform the update operation. FIG. 5 illustrates an update path computed for binary tree 420 of FIG. 4 removing node 4 from the five-member group. Regardless of which device is the initiator of the removal request, the update path is computed starting from node 4. Initial secret, s4, is chosen at random and then used to derive secret, s5, for node 5 along with a new public/private key pair for node 4 (not depicted). Secret, s5, is similarly first used to derive secret, s3, for node 3 and a key pair for node 5. It's then encrypted with the public key from node 7, the former root node of the tree now residing in node 6's former position, to produce the encrypted secret, e5,7'. The remainder of the update path is computed as illustrated in FIG. 3. Secret, s3, derives secret, s7, for the new root node; each secret is used to derive its respective key pair; and both are encrypted with the public keys of node's 1 and 8, respectively, producing outputs e3, 1 and e7,8.

Once the update is complete, group management system 102 (e.g., via tree update subsystem 114) may replace the root node parameters within the sibling leaf node with the sibling node parameters from the temporary storage. That is, group management system 102 may overwrite the data within the sibling leaf node with a public key and private key of the sibling node that was stored in the temporary storage. In some embodiments, group management system 102 may, instead of replacing root node parameters, replace the root node with the sibling leaf node. The replacement operation may include updating a first set of pointers associated with the sibling leaf node and a second set of pointers associated with the root node. For example, all pointers pointing to the node being replaced may point to a new node. In addition, all pointers within the new node may be replaced with all pointers from the node being replaced.

Figure 6:
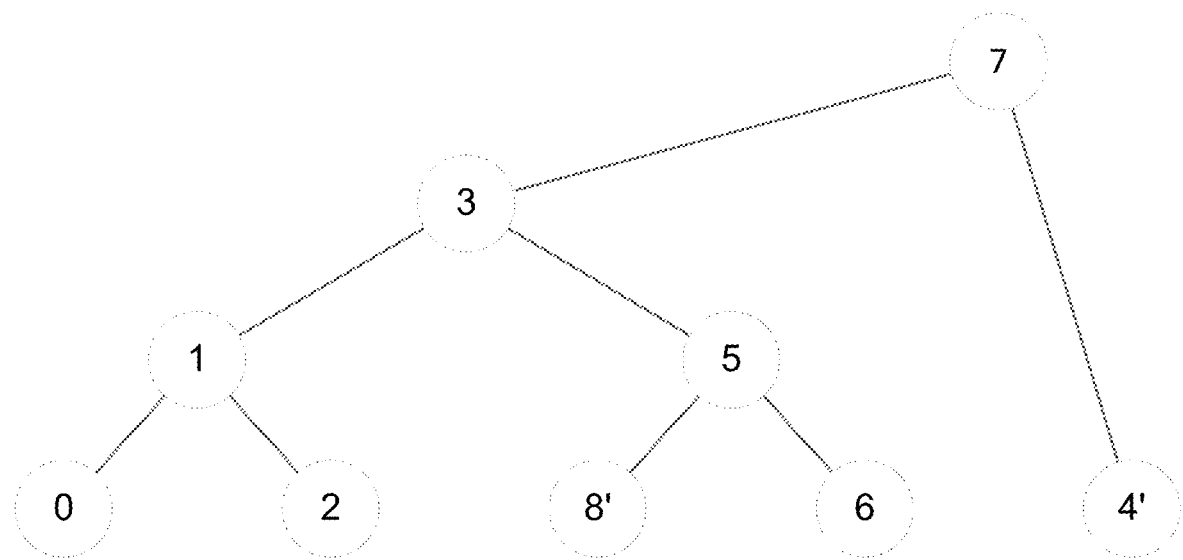
FIG. 6 illustrates swapping the leaving leaf node with the right-most node and pruning the binary tree, in accordance with some embodiments.
Figure 6:
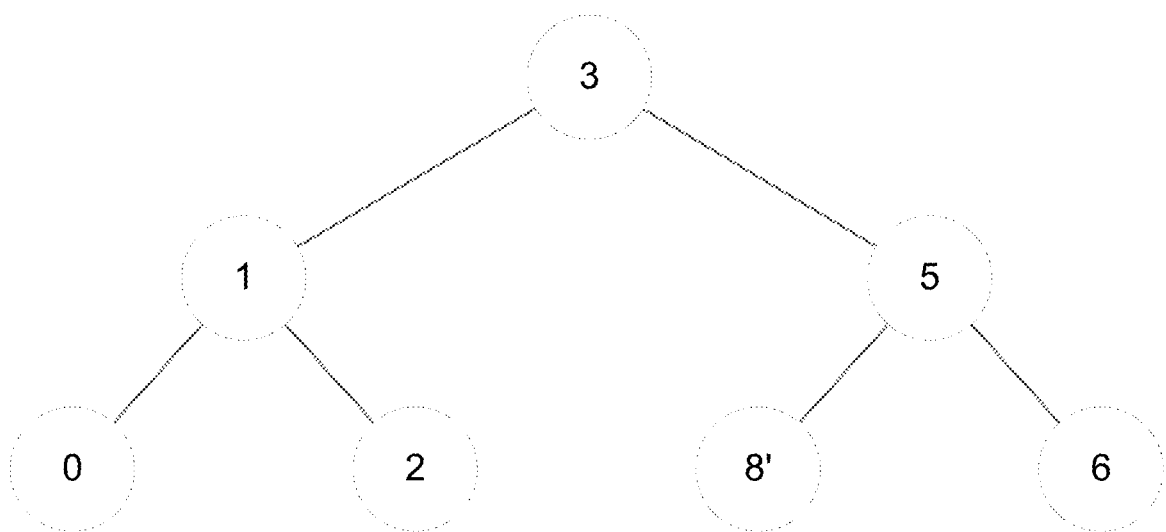

Once the replacement operations are complete, group management system 102 (e.g., via tree update subsystem 114) may interchange node parameters within the leaving leaf node with right-most node parameters from the right-most leaf node. This node (Node 8 containing parameters of node 4) and its immediate parent are no longer needed in the group, such that they can both be pruned from the binary tree. Binary tree 600 of FIG. 6 illustrates the binary tree after the replacement and interchange operations are completed, and binary tree 620 of FIG. 6 illustrates the resulting tree after the pruning operation has been completed. In some embodiments, the replacement operation or an interchange operation may involve moving pointers to different nodes instead of interchanging node parameters. For example, the sibling leaf node that is in temporary storage outside of the binary tree may be moved (e.g., using pointer updates) into an appropriate location within the binary tree.

When the local update is complete, group management system 102 may instruct other computing devices within the group to update associated local copies of the binary tree. Thus, group management system 102 may identify a plurality of devices associated with the group. For example, device identifiers and device addresses may be stored at each leaf node or at another suitable location. In some embodiments, group management system 102 may retrieve the device identifiers or device addresses from the associated leaf nodes. Group management system 102 may then transmit a binary tree update notification to each device of the plurality of devices. In some embodiments, the binary tree update notification may include an identifier of the leaving leaf node. In response, each device may update a corresponding local binary tree by decrypting corresponding secret keys along the update path and deriving the corresponding private keys and other public keys for each node.

Accordingly, shifting the nodes in this way before and after the update operation accommodates the changing context of the right-most node (node eight) which is able to access the private keys for its new path up to the root of the tree after it changes position. For example, given that every node in the binary tree possesses the private key stored at the root of the tree, by moving this node to the bottom of the update path, group management system 102 may ensure that, no matter where the right-most node ends up, it will be able to decrypt the first secret of the update path and derive all the needed key pairs for its new path up to the root.

In order to decrypt the resultant update path, each member (e.g., a computing device of each member of computing devices 108a-108n) may first perform the same tree modification including moving the root node to the sibling position of the leaving node and moving the sibling temporarily out of the tree. Each computing device may then decrypt the update path with the rearranged keys and may generate and add the new key pairs. Each computing device may then move the sibling leaf node back in place and may prune the right side of the tree. Group management system 102 may then continue with the remainder of the update.

In some embodiments, group management system 102 may receive a message that another computing device has updated the binary tree by removing a user from the group. Thus, group management system 102 may receive a group update request. The group update request may indicate that a second user has been removed from the group. For example, group management system 102 may receive an updated binary tree or an instruction to apply an update to a local copy of the binary tree. Group management system may locate a new leaving node within the binary tree and perform a binary tree update to remove the new leaving node.

Figure 7:
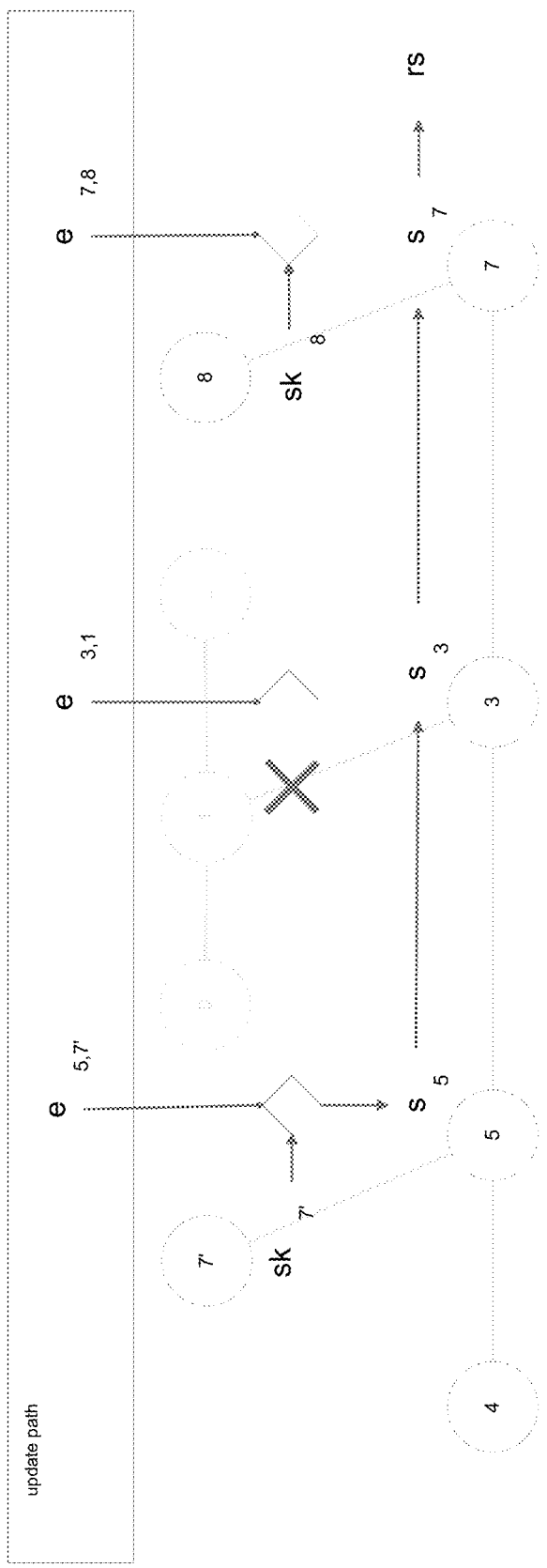
FIG. 7 illustrates iterating through a received update path by another device in the group to update its binary tree, in accordance with some embodiments.

FIG. 7 illustrates and update operation 700 for binary tree 420 illustrated in FIG. 4 as performed by the group member associated with node 8 upon reception of the group update request and the update path contained therein. Having already moved Node 7 to the position of Node 6, the decryption operates similar to that as illustrated in 320 of FIG. 3. The receiving group member decrypts e5,7' using the private key from the node properties of Node 7 to compute secret, s5, which in turn is used to derive the new public/private key pair for node 5. Secret s5 then derives secret, s3, which then derives secret, s7, and each of those secrets in turn derives their associated key pairs. In this example, given that node 8 possesses the private key, sk8, it would be possible but unnecessary to decrypt e7,8 to compute secret, s7.

Figure 8:
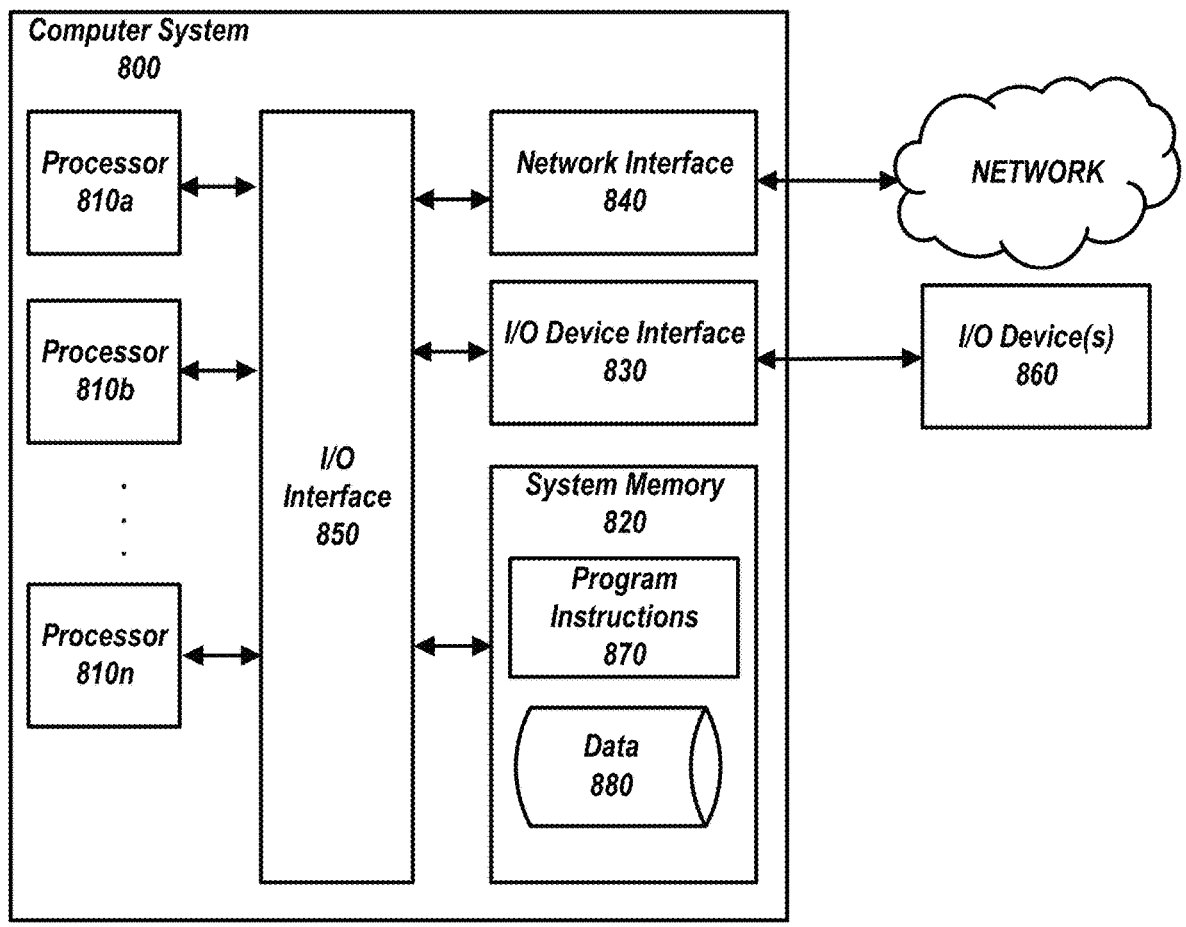
FIG. 8 is a diagram that illustrates an exemplary computing system in accordance with some embodiments.

FIG. 8 is a diagram that illustrates an exemplary computing system 800 in accordance with embodiments of the present technique. Various portions of systems and methods described herein, may include or be executed on one or more computer systems similar to computing system 800. Further, processes and modules described herein may be executed by one or more processing systems similar to that of computing system 800. Computing devices 108a-108n may include one or more components of computing system 800. Group management system 102 and server 104 may include one or more components of computing system 800.

Computing system 800 may include one or more processors (e.g., processors 810a-810n) coupled to system memory 820, an input/output I/O device interface 830, and a network interface 840 via an input/output (I/O) interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a units-processor system including one processor (e.g., processor 810a or process 810b, or processor 810n), or a multi-processor system including any number of suitable processors (e.g., 810a-810n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 800 may include a plurality of computing devices (e.g., distributed computer systems) to implement various processing functions.

I/O device interface 830 may provide an interface for connection of one or more I/O devices 860 to computing system 800. I/O devices may include devices that receive input (e.g., from a user) or output information (e.g., to a user). I/O devices 860 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computing system 800 through a wired or wireless connection. I/O devices 860 may be connected to computing system 800 from a remote location. I/O devices 860 located on a remote computer system, for example, may be connected to computing system 800 via a network and network interface 840.

Network interface 840 may include a network adapter that provides for connection of computing system 800 to a network. Network interface 840 may facilitate data exchange between computing system 800 and other devices connected to the network. Network interface 840 may support wired or wireless communication. The network may include an electronic communication network, such as the Internet, a local area network (LAN), a wide area network (WAN), a cellular communications network, or the like.

System memory 820 may be configured to store program instructions 870 or data 880. Program instructions 870 may be executable by a processor (e.g., one or more of processors 810a-810n) to implement one or more embodiments of the present techniques. Instructions 870 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 820 may include a non-transitory computer readable storage medium that may have program instructions stored thereon that are executable by a computer processor (e.g., one or more of processors 810a-810n) to cause the subject matter and the functional operations described herein. A memory (e.g., system memory 820) may include a single memory device and/or a plurality of memory devices (e.g., distributed memory devices).

I/O interface 850 may be configured to coordinate I/O traffic between processors 810a-810n, system memory 820, network interface 840, I/O devices 860, and/or other peripheral devices. I/O interface 850 may perform protocol, timing, or other data transformations to convert data signals from one component (e.g., system memory 820) into a format suitable for use by another component (e.g., processors 810a-810n). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 800 or multiple computer systems 800 configured to host different portions or instances of embodiments. Multiple computer systems 800 may provide for parallel or sequential processing/execution of one or more portions of the techniques described herein.

Those skilled in the art will appreciate that computing system 800 is merely illustrative and is not intended to limit the scope of the techniques described herein. Computing system 800 may include any combination of devices or software that may perform or otherwise provide for the performance of the techniques described herein. For example, computing system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 800 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 800 may be transmitted to computing system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 9:
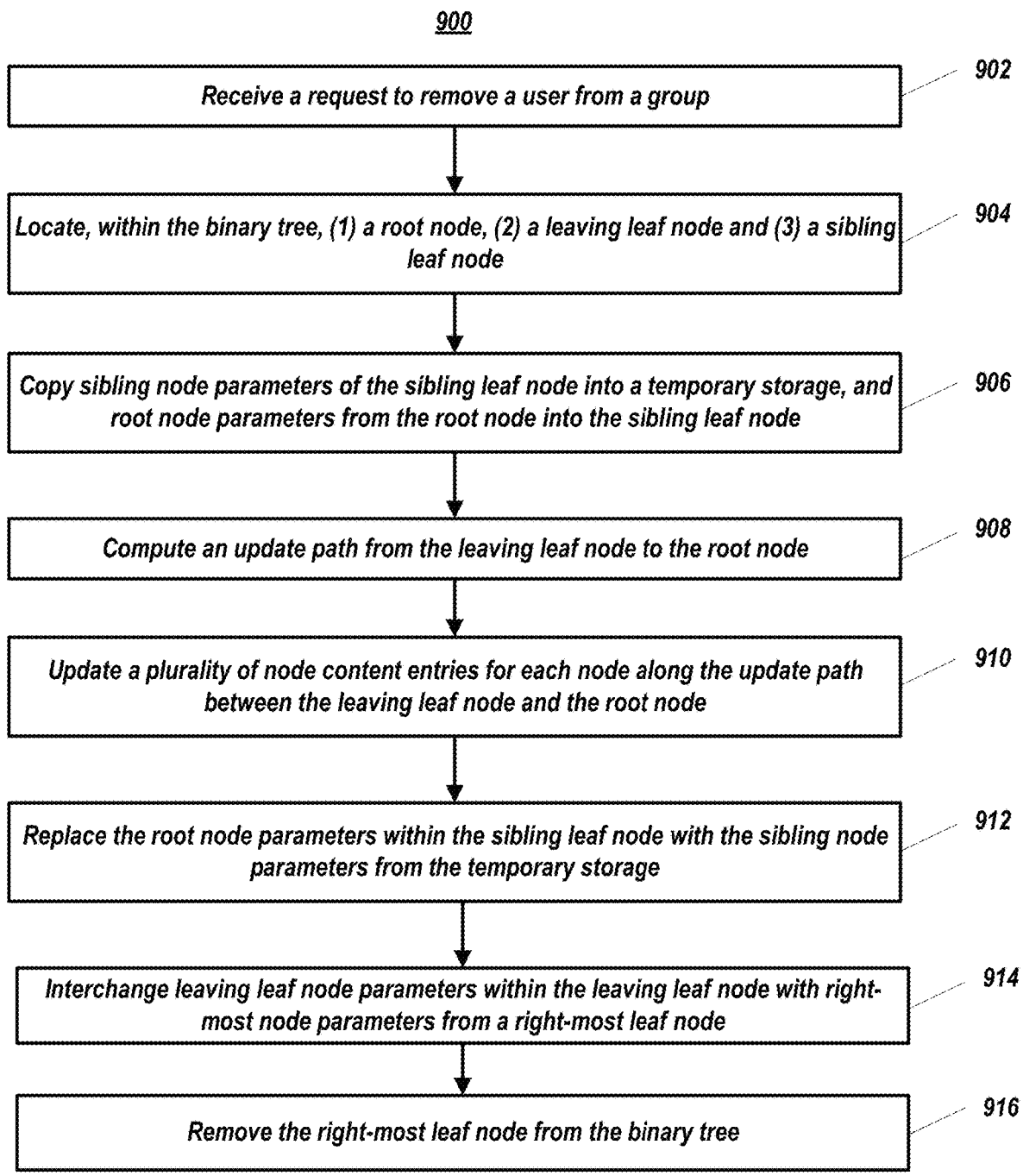
FIG. 9 illustrates an example flowchart of operations performed on a client device, in accordance with some embodiments of this disclosure.

FIG. 9 shows an example flowchart of a mechanism 900 for removing a user from a group. At 902, group management system 102 receives a request to remove a user or a device from a group. For example, group management system 102 may be hosted on a computer system 800. Thus, the request may be received via I/O device(s) 860 (e.g., from a keyboard or microphone) or through network interface 840 (e.g., from a Bluetooth device) and then passed via I/O Interface 850 to system memory 820. For example, a user may have multiple devices that are all part of the group and enable access to group messages. If a request is received to remove the user from the group, group management system 102 may determine which devices are part of the group (e.g., part of the binary tree) and may perform the removing operation for each device.

At 904, group management system 102 (e.g., using one or more components in system 100 (FIG. 1) and/or computing system 800 via one or more processors 810a-810n and system memory 820 (FIG. 8)) locates, within the binary tree, (1) a root node, (2) a leaving leaf node and (3) a sibling leaf node. At 906, group management system 102 (e.g., using one or more components in system 100 (FIG. 1) and/or computing system 800 via one or more processors 810a-810n, I/O interface 850, and/or system memory 820 (FIG. 8)) copies sibling node parameters of the sibling leaf node into a temporary storage, and root node parameters from the root node into the sibling leaf node. In some embodiments, group management system 102, instead of copying the parameters may perform pointer manipulation to update the binary tree. That is, the pointers for various nodes are updated to place the node in an appropriate location (e.g., to place the parameters of that node into an appropriate location within the binary tree or outside the binary tree).

At 908, group management system 102 (e.g., using one or more components in system 100 (FIG. 1) and/or computing system 800 via one or more processors 810a-810n (FIG. 8)) computes an update path from the leaving leaf node to the root node. At 910, group management system 102 (e.g., using one or more components in system 100 (FIG. 1) and/or computing system 800 (FIG. 8)) updates a plurality of node content entries for each node along the update path between the leaving leaf node and the root node. At 912, group management system 102 (e.g., using one or more components in system 100 (FIG. 1) and/or computing system 800 via the network interface 840 (FIG. 8)) replaces the root node parameters within the sibling leaf node with the sibling node parameters from the temporary storage.

At 914, group management system 102 (e.g., using one or more components in system 100 (FIG. 1) and/or computing system 800 via one or more processors 810a-810n (FIG. 8)) interchanges leaving leaf node parameters within the leaving leaf node with right-most node parameters from a right-most leaf node. At 916, group management system 102 (e.g., using one or more components in system 100 (FIG. 1) and/or computing system 800 via the network interface 840 (FIG. 8)) removes the right-most leaf node from the binary tree.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or components discussed in relation to FIGS. 1-8 could be used to perform one or more of the actions in FIG. 9.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to cost constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for managing group membership, the method comprising: receiving a request to remove a user from a group, wherein the group is associated with a binary tree, and wherein the binary tree comprises a plurality of leaf nodes with each leaf node of the plurality of leaf nodes representing a corresponding user within the group; locating, within the binary tree, (1) a root node, (2) a leaving leaf node associated with the user being removed from the group, (3) a sibling leaf node corresponding to a node that shares a parent node with the leaving leaf node, (4) a right-most leaf node, and (5) the immediate parent of the right-most leaf node; copying sibling node parameters of the sibling leaf node into a temporary storage, and root node parameters from the root node into the sibling leaf node; computing an update path from the leaving leaf node to the root node, wherein the update path comprises a plurality of nodes connecting the leaving leaf node to the root node; updating a plurality of node parameters for each node along the update path between the leaving leaf node and the root node; replacing the root node parameters within the sibling leaf node with the sibling node parameters from the temporary storage; interchanging leaving leaf node parameters within the leaving leaf node with right-most node parameters from a right-most leaf node; removing the right-most leaf node from the binary tree; and either removing the immediate parent of the right-most leaf node or replacing it with the sibling of the right-most leaf node.

2. The method of any of prior embodiments, wherein the sibling node parameters comprise a sibling node private key and a sibling node public key for a given node.

3. The method of any of prior embodiments, wherein computing the update path from the leaving leaf node to the root node comprises: determining a plurality of parent nodes for the leaving leaf node; identifying the root node based on the root node not identifying any parent nodes; choosing or deriving a series of secrets, one for each node along the update path; deriving a series of public/private key pairs, one pair for each node along the update path, from the corresponding respective secret; and using the private key stored within the respective sibling leaf nodes to encrypt the series of secrets.

4. The method of any of prior embodiments, wherein copying root node parameters from the root node into the sibling leaf node comprises: erasing the sibling node parameters from the sibling leaf node and erasing the root node parameters from the root node.

5. The method of any of prior embodiments, wherein updating the plurality of node parameters for each node along the update path comprises iterating through each node within the update path to derive, using a derived secret key, a corresponding node private key and a corresponding node public key.

6. The method of any of prior embodiments, further comprising: receiving a group update request, wherein the group update request indicates that a second user has been removed from the group; locating a new leaving node within the binary tree; and performing a binary tree update to remove the new leaving node.

7. The method of any of prior embodiments, further comprising: identifying a plurality of devices associated with the group; and transmitting a binary tree update notification to each device of the plurality of devices, wherein the binary tree update notification comprises an identifier of the leaving leaf node, and wherein each of the plurality of devices updates a corresponding local binary tree by decrypting corresponding secret keys along the update path and by deriving other secret keys and other public/private key pairs along the update path.

8. A tangible, non-transitory, machine-readable medium storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

What is claimed is:

1. A system for managing group membership, the system comprising:
one or more processors; and
a non-transitory computer-readable storage medium storing instructions, which when executed by the one or more processors cause the one or more processors to:
receive a request to remove a user from a group, wherein the group is associated with a binary tree, and wherein the binary tree comprises a plurality of leaf nodes with each leaf node of the plurality of leaf nodes representing a corresponding user or device within the group;
locate, within the binary tree, (1) a root node, (2) a leaving leaf node associated with the user being removed from the group, (3) a sibling leaf node corresponding to a node that shares a parent node with the leaving leaf node, (4) a right-most leaf node, and (5) an immediate parent of the right-most leaf node;
copy sibling node parameters of the sibling leaf node into a temporary storage, and root node parameters from the root node into the sibling leaf node, wherein the sibling node parameters comprises a sibling node private key and a sibling node public key, and wherein the root node parameters comprises a root private key and a root public key;
compute an update path from the leaving leaf node to the root node, wherein the update path comprises a plurality of nodes connecting the leaving leaf node to the root node;
update a plurality of private keys and a plurality of public keys for each node along the update path between the leaving leaf node and the root node;

replace the root node parameters within the sibling leaf node with the sibling node parameters from the temporary storage;

interchange leaving leaf node parameters within the leaving leaf node with right-most leaf node parameters from the right-most leaf node; and remove the right-most leaf node from the binary tree.

2. The system of claim 1, wherein the instructions for copying the root node parameters from the root node into the sibling leaf node cause the one or more processors to:

erase the sibling node parameters from the sibling leaf node; and erase the root node parameters from the root node.

3. The system of claim 1, wherein the instructions for computing the update path from the leaving leaf node to the root node, cause the one or more processors to:

determine a plurality of parent nodes for the leaving leaf node;

identify the root node based on the root node not identifying any parent nodes; and use the root private key and the root public key stored within the sibling leaf node to perform operations related to the root node.

4. The system of claim 1, wherein the instructions for updating the plurality of private keys and the plurality of public keys for each node along the update path cause the one or more processors to iterate through each node within the update path to derive a corresponding node private key and a corresponding node public key, wherein a first node within the update path is updated using the root node parameters.

5. The system of claim 1, wherein the instructions further cause the one or more processors to:

receive a group update request, wherein the group update request indicates that a second user has been removed from the group;

locate a new leaving node within the binary tree; and perform a binary tree update to remove the new leaving node.

6. The system of claim 1, wherein the instructions further cause the one or more processors to:

identify a plurality of devices associated with the group; and transmit a binary tree update notification to each device of the plurality of devices, wherein the binary tree update notification comprises an identifier of the leaving leaf node, and wherein each of the plurality of devices updates a corresponding local binary tree by decrypting corresponding secret keys along the update path and by deriving other secret keys and other public/private keypairs along the update path.

7. A method for managing group membership, the method comprising:

receiving a request to remove a user from a group, wherein the group is associated with a binary tree, and wherein the binary tree comprises a plurality of leaf nodes with each leaf node of the plurality of leaf nodes representing a corresponding user within the group;

locating, within the binary tree, (1) a root node, (2) a leaving leaf node associated with the user being removed from the group and (3) a sibling leaf node corresponding to a node that shares a parent node with the leaving leaf node;

updating a first set of pointers associated with the sibling leaf node to assign the sibling leaf node to a temporary storage, and a second set of pointers associated with the root node to assign the root node to a position of the sibling leaf node within the binary tree;

computing an update path from the leaving leaf node to the root node, wherein the update path comprises a plurality of nodes connecting the leaving leaf node to the root node;

updating a plurality of node content entries for each node along the update path between the leaving leaf node and the root node;

replacing the root node with the sibling leaf node, wherein a replacement operation comprises updating the first set of pointers associated with the sibling leaf node and the second set of pointers associated with the root node;

interchanging the leaving leaf node with a right-most leaf node; and removing the right-most leaf node along with its immediate parent node from the binary tree, wherein a removal operation comprises pointer manipulation within the binary tree.

8. The method of claim 7, wherein the sibling leaf node comprises a sibling node private key and a sibling node public key, and wherein the root node comprises a root private key and a root public key.

9. The method of claim 8, wherein computing the update path from the leaving leaf node to the root node comprises:

determining a plurality of parent nodes for the leaving leaf node;

identifying the root node; and using the root private key and the root public key stored within the sibling leaf node to perform operations related to the root node.

10. The method of claim 7, wherein assigning the root node to the position of the sibling leaf node within the binary tree comprises:

identifying a first plurality of pointers within the sibling leaf node;

identifying a second plurality of pointers that point to the sibling leaf node; and replacing pointers within the root node with the first plurality of pointers, and pointers that point to the root node with the second plurality of pointers.

11. The method of claim 7, wherein updating the plurality of node content entries for each node along the update path comprises iterating through each node within the update path to derive a corresponding node private key and a corresponding node public key, wherein a first node within the update path is updated using root node parameters.

12. The method of claim 7, further comprising:

receiving a group update request, wherein the group update request indicates that a second user has been removed from the group;

locating a new leaving node within the binary tree; and performing a binary tree update to remove the new leaving node.

13. The method of claim 7, further comprising:

identifying a plurality of devices associated with the group; and transmitting a binary tree update notification to each device of the plurality of devices, wherein the binary tree update notification comprises an identifier of the leaving leaf node, and wherein each of the plurality of devices updates a corresponding local binary tree by decrypting corresponding secret keys along the update path and by deriving other secret keys and other public/private key pairs along the update path.

14. A non-transitory, computer-readable storage medium storing instructions, which when executed by one or more processors cause the one or more processors to perform operations comprising:
- receiving a request to remove a user from a group, wherein the group is associated with a binary tree, and wherein the binary tree comprises a plurality of leaf nodes with each leaf node of the plurality of leaf nodes representing a corresponding user within the group;
- locating, within the binary tree, (1) a root node, (2) a leaving leaf node associated with the user being removed from the group and (3) a sibling leaf node corresponding to a node that shares a parent node with the leaving leaf node;
- copying sibling node parameters of the sibling leaf node into a temporary storage, and root node parameters from the root node into the sibling leaf node;
- computing an update path from the leaving leaf node to the root node, wherein the update path comprises a plurality of nodes connecting the leaving leaf node to the root node;
- updating a plurality of node content entries for each node along the update path between the leaving leaf node and the root node;
- replacing the root node parameters within the sibling leaf node with the sibling node parameters from the temporary storage;
- interchanging leaving leaf node parameters within the leaving leaf node with right-most node parameters from a right-most leaf node; and
- removing the right-most leaf node and its immediate parent node from the binary tree.

15. The non-transitory, computer-readable storage medium of claim 14, wherein the sibling node parameters comprises a sibling node private key and a sibling node public key, and wherein the root node parameters comprise a root private key and a root public key.

16. The non-transitory, computer-readable storage medium of claim 15, wherein the instructions for computing the update path from the leaving leaf node to the root node further cause the one or more processors to perform operations comprising:
- determining a plurality of parent nodes for the leaving leaf node;
- identifying the root node based on the root node not identifying any parent nodes; and
- using the root private key and the root public key stored within the sibling leaf node to perform operations related to the root node.

17. The non-transitory, computer-readable storage medium of claim 14, wherein the instructions for copying the root node parameters from the root node into the sibling leaf node further cause the one or more processors to perform operations comprising:
- erasing the sibling node parameters from the sibling leaf node; and
- erasing the root node parameters from the root node.

18. The non-transitory, computer-readable storage medium of claim 14, wherein the instructions for updating the plurality of node content entries for each node along the update path further cause the one or more processors to iterate through each node within the update path to derive a corresponding node private key and a corresponding node public key.

19. The non-transitory, computer-readable storage medium of claim 14, wherein the instructions further cause the one or more processors to perform operations comprising:
- receiving a group update request, wherein the group update request indicates that a second user has been removed from the group;
- locating a new leaving node within the binary tree; and
- performing a binary tree update to remove the new leaving node.

20. The non-transitory, computer-readable storage medium of claim 14, wherein the instructions further cause the one or more processors to perform operations comprising:
- identifying a plurality of devices associated with the group; and
- transmitting a binary tree update notification to each device of the plurality of devices, wherein the binary tree update notification comprises an identifier of the leaving leaf node, and wherein each of the plurality of devices updates a corresponding local binary tree by decrypting corresponding secret keys along the update path and by deriving other secret keys and other public/private key pairs along the update path.

* * * * *